US010800863B2

(12) United States Patent
Kim et al.

(10) Patent No.: US 10,800,863 B2
(45) Date of Patent: Oct. 13, 2020

(54) TRANSITION METAL COMPLEXES, CATALYST COMPOSITIONS INCLUDING THE SAME, AND METHOD FOR PREPARING POLYOLEFINS THEREWITH

(71) Applicant: LG Chem, Ltd., Seoul (KR)

(72) Inventors: Dong Eun Kim, Daejeon (KR); A Rim Kim, Daejeon (KR); Jin Sam Gong, Daejeon (KR); Choong Hoon Lee, Daejeon (KR); Seung Hwan Jung, Daejeon (KR)

(73) Assignee: LG Chem, Ltd. (KR)

( * ) Notice: Subject to any disclaimer, the term of this patent is extended or adjusted under 35 U.S.C. 154(b) by 74 days.

(21) Appl. No.: 15/744,429

(22) PCT Filed: Oct. 20, 2016

(86) PCT No.: PCT/KR2016/011839
§ 371 (c)(1),
(2) Date: Jan. 12, 2018

(87) PCT Pub. No.: WO2017/069538
PCT Pub. Date: Apr. 27, 2017

(65) Prior Publication Data
US 2018/0194874 A1 Jul. 12, 2018

(30) Foreign Application Priority Data
Oct. 21, 2015 (KR) .................. 10-2015-0146840

(51) Int. Cl.
C08F 4/76 (2006.01)
C08F 210/16 (2006.01)
C07F 9/535 (2006.01)
C07F 17/00 (2006.01)
B01J 31/02 (2006.01)
C01G 23/00 (2006.01)
C08F 4/659 (2006.01)
C08F 2/06 (2006.01)
C08L 23/06 (2006.01)
C08L 23/12 (2006.01)
C08L 23/18 (2006.01)
C08L 47/00 (2006.01)

(52) U.S. Cl.
CPC ............. *C08F 4/76* (2013.01); *B01J 31/0265* (2013.01); *C01G 23/002* (2013.01); *C07F 9/5355* (2013.01); *C07F 17/00* (2013.01); *C08F 210/16* (2013.01); *C08F 2/06* (2013.01); *C08F 4/65908* (2013.01); *C08F 2420/04* (2013.01); *C08F 2420/06* (2013.01); *C08L 23/06* (2013.01); *C08L 23/12* (2013.01); *C08L 23/18* (2013.01); *C08L 47/00* (2013.01)

(58) Field of Classification Search
None
See application file for complete search history.

(56) References Cited

U.S. PATENT DOCUMENTS

| | | | |
|---|---|---|---|
| 3,420,864 A | 1/1969 | Riess et al. |
| 7,365,137 B2 | 4/2008 | Resconi et al. |
| 8,962,775 B2 | 2/2015 | Hoang et al. |
| 2007/0225158 A1 | 9/2007 | Lee et al. |
| 2007/0260023 A1 | 11/2007 | Jones et al. |
| 2007/0260025 A1 | 11/2007 | Elder et al. |
| 2009/0018293 A1 | 1/2009 | Ijpeij et al. |
| 2010/0190937 A1 | 7/2010 | Hoang et al. |
| 2014/0024789 A1 | 1/2014 | Ker et al. |
| 2015/0246980 A1 | 9/2015 | O'Hare |
| 2015/0284489 A1 | 10/2015 | Nagy et al. |
| 2015/0361196 A1 | 12/2015 | Do et al. |
| 2017/0218105 A1 | 8/2017 | Kim et al. |

FOREIGN PATENT DOCUMENTS

| | | |
|---|---|---|
| EP | 2873671 A1 | 5/2015 |
| EP | 3162817 A1 | 5/2017 |
| JP | 2007511475 A | 5/2007 |
| KR | 20070018930 A | 2/2007 |
| KR | 20070020271 A | 2/2007 |
| KR | 100820542 B1 | 4/2008 |
| KR | 20150034652 A | 4/2015 |
| KR | 20150038219 A | 4/2015 |
| KR | 20150065687 A | 6/2015 |
| KR | 20160115704 A | 10/2016 |
| WO | 2001019512 A1 | 3/2001 |

OTHER PUBLICATIONS

Extended European Search Report including Written Opinion for Application No. EP16857796.3 dated Sep. 4, 2018.
Interational Search Report for Application No. PCT/KR2016/011839, dated Feb. 9, 2017.
Buffet et al., Ethylene polymerisation using solid catalysts based on layered double hydroxides, Polymer Chemistry, vol. 6(13), pp. 2493-2503, Feb. 2015.
Park et al., Preparation of half-titanocenes of thiophene-fused trimethylcyclopentadienyl ligands and their ethylene copolymerization reactivity, Journal of Organometallic Chemistry, vol. 696, Issues 11-12, pp. 2451-2456, Jun. 2011.

*Primary Examiner* — Yun Qian
(74) *Attorney, Agent, or Firm* — Lerner, David, Littenberg, Krumholz & Mentlik, LLP

(57) ABSTRACT

The present invention relates to a transition metal complex that exhibits high activity in the polymerization reaction of olefin monomers and improved copolymerization activity, thus enabling the preparation of a low density, high molecular weight polyolefin, a catalyst composition including the same, and a method for preparing a polyolefin using the composition.

3 Claims, No Drawings

TRANSITION METAL COMPLEXES, CATALYST COMPOSITIONS INCLUDING THE SAME, AND METHOD FOR PREPARING POLYOLEFINS THEREWITH

CROSS REFERENCE TO RELATED APPLICATIONS

This application is a national phase entry under 35 U.S.C. § 371 of International Application No. PCT/KR2016/011839, filed on Oct. 20, 2016 which claims priority to Korean Patent Application No. 10-2015-0146840 filed in the Republic of Korea on Oct. 21, 2015, the disclosures of which are herein incorporated by reference.

TECHNICAL FIELD

The present invention relates to transition metal complexes, a catalyst composition including the same, and a method for preparing a polyolefin therewith.

BACKGROUND OF ART

In the existing commercial preparation process of a polyolefin, Ziegler-Natta catalysts of titanium or vanadium compounds have been widely used. However, although the Ziegler-Natta catalyst has high activity, since it is a multi-site catalyst, the molecular weight distribution of the produced polymer is wide and the composition distribution of comonomers is not uniform, and thus there is a limitation in terms of securing desired properties.

In order to overcome such limitations, metallocene catalysts in which transition metal such as titanium, zirconium, hafnium, etc. and ligands including cyclopentadiene functional groups are bonded were developed and are being widely used.

The metallocene catalyst is a single-site catalyst, the molecular weight distribution of the produced polymer is narrow, and it can control the molecular weight, stereoregularity, crystallinity, etc. according to the structures of the catalyst and ligand. However, a polyolefin polymerized with the metallocene catalyst has a low melting point and narrow molecular weight distribution, and thus if such polyolefin is applied in the product, productivity may be remarkably lowered due to extrusion load, etc., thus rendering field application difficult.

Particularly, in order to overcome the above-explained problems of the metallocene catalyst, many metallocene compounds coordinated with ligand compounds including heteroatoms have been suggested. However, among them, only a few metallocene catalysts are being practically applied in the commercial process.

Particularly, although many catalysts enabling the obtainment of a high molecular weight polymer with high reactivity were suggested, the copolymerization activity is relatively lowered, and thus the preparation of a polyolefin with high molecular weight but low density is still limited.

PRIOR ART LITERATURE

Patent Document (Patent Document 1) Korean Registered Patent Publication No. 10-0820542 (2008 Apr. 1)

DETAILED DESCRIPTION OF THE INVENTION

Technical Problem

It is an object of the present invention to provide a transition metal complex with a novel structure, which exhibits high activity to the polymerization reaction of olefin monomers and improved copolymerization activity, thus enabling the preparation of a polyolefin that has high molecular weight but low density.

It is another object of the present invention to provide a catalyst composition for olefin polymerization including the transition metal complex.

It is still another object of the present invention to provide a method for preparing a polyolefin using the catalyst composition.

Technical Solution

According to the present invention, a transition metal complex represented by the following Chemical Formula 1 is provided:

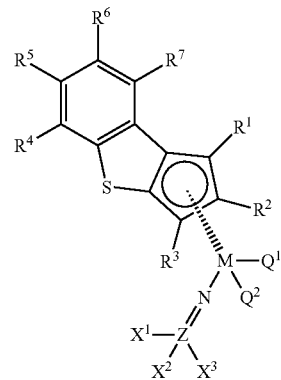

wherein, in Chemical Formula 1,
$R^1$ to $R^7$ are each independently hydrogen, a C1-20 hydrocarbyl group, or a C1-20 heterohydrocarbyl group;
M is Group 4 transition metal;
$Q^1$ and $Q^2$ are each independently hydrogen, a halogen, a C1-20 alkyl group, a C2-20 alkenyl group, a C6-20 aryl group, a C7-20 alkylaryl group, a C7-20 arylalkyl group, a C1-20 alkylamino group, a C6-20 arylamino group, or a C1-20 alkylidene group;
Z is phosphorous (P), arsenic (As), or antimony (Sb); and
$X^1$ to $X^3$ are each independently hydrogen, a halogen, a C1-20 hydrocarbyl group, or a C1-20 heterohydrocarbyl group.

According to the present invention, a catalyst composition including the above-described transition metal complex and a cocatalyst is provided.

According to the present invention, a method for preparing a polyolefin including the step of polymerizing olefin monomers in the presence of the above-described catalyst composition for olefin polymerization is provided.

Hereinafter, the transition metal complexes, catalyst composition, and method for preparing a polyolefin according to the embodiments of the invention will be explained in detail.

Technical terms in the present specification are only for mentioning specific embodiments, and they are not intended to restrict the present invention unless there is a particular mention about them.

The singular expressions used herein may include the plural expressions unless they are differently expressed contextually.

The meaning of the term "include" used in the specification embodies specific characteristics, areas, essences, steps, actions, elements, and/or components, and does not exclude existence or addition of other specific characteristics, areas, essences, steps, actions, elements, components, and/or groups.

I. Transition Metal Compound

According to one embodiment of the invention, a transition metal complex represented by the following Chemical Formula 1 is provided:

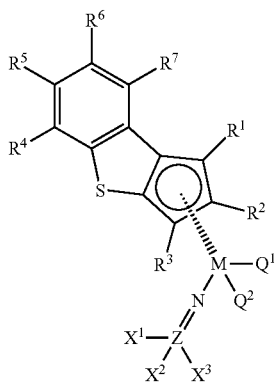

wherein, in Chemical Formula 1, $R^1$ to $R^7$ are each independently hydrogen, a C1-20 hydrocarbyl group, or a C1-20 heterohydrocarbyl group;

M is Group 4 transition metal;

$Q^1$ and $Q^2$ are each independently hydrogen, a halogen, a C1-20 alkyl group, a C2-20 alkenyl group, a C6-20 aryl group, a C7-20 alkylaryl group, a C7-20 arylalkyl group, a C1-20 alkylamino group, a C6-20 arylamino group, or a C1-20 alkylidene group;

Z is phosphorous (P), arsenic (As), or antimony (Sb); and $X^1$ to $X^3$ are each independently hydrogen, a halogen, a C1-20 hydrocarbyl group, or a C1-20 heterohydrocarbyl group.

The transition metal complex represented by Chemical Formula 1 has a structure wherein a phosphinimide ligand is connected to a cyclopentadiene derivative having a sulfur-containing heterocycle.

As the result of continuous studies by the present inventors, it was confirmed that the transition metal complex represented by Chemical Formula 1, due to the influence of the cyclopentadiene derivative having a heterocycle, if used as a catalyst for the copolymerization of ethylene and octene, hexene, butene, etc., may exhibit high activity and particularly improved copolymerization activity, thus enabling the obtainment of a polyolefin with high molecular weight but low density.

In Chemical Formula 1, M may be a Group 4 transition metal atom of the periodic table, and preferably, may be titanium (Ti), zirconium (Zr), or hafnium (Hf).

Further, in Chemical Formula 1, $Q^1$ and $Q^2$ may each independently be hydrogen, a halogen, a C1-20 alkyl group, a C2-20 alkenyl group, a C6-20 aryl group, a C7-20 alkylaryl group, a C7-20 arylalkyl group, a C1-20 alkylamino group, a C6-20 arylamino group, or a C1-20 alkylidene group. Preferably, $Q^1$ and $Q^2$ may each independently be a halogen or a C1-10 alkyl group. Particularly, if using a compound of Chemical Formula 1 wherein $Q^1$ and $Q^2$ are each independently an alkyl group, a more improved polyolefin yield may be obtained.

In Chemical Formula 1, Z is phosphorous (P), arsenic (As), or antimony (Sb), and may preferably be phosphorous (P).

In Chemical Formula 1, $R^1$ to $R^7$ may each independently be hydrogen, a C1-20 hydrocarbyl group, or a C1-20 heterohydrocarbyl group. Preferably, $R^1$ to $R^7$ may each independently be hydrogen, a C1-10 alkyl group, a C2-10 alkenyl group, a C2-10 alkynyl group, a C1-20 alkoxy group, a C6-20 aryl group, a C3-20 cycloalkyl group, a C7-20 alkylaryl group, or a C7-20 arylalkyl group.

In Chemical Formula 1, $X^1$ to $X^3$ may each independently be hydrogen, a halogen, a C1-20 hydrocarbyl group, or a C1-20 heterohydrocarbyl group. Preferably, $X^1$ to $X^3$ may each independently be hydrogen, a halogen, a C1-10 alkyl group, a C2-10 alkenyl group, a C2-10 alkynyl group, a C1-20 alkoxy group, a C6-20 aryl group, a C3-20 cycloalkyl group, a C7-20 alkylaryl group, or a C7-20 arylalkyl group.

In the definition of the substituents, the alkyl group, alkenyl group, and alkynyl group may respectively have a linear or branched structure.

It is preferable that the aryl group is a C6-20 aromatic ring, and non-limiting examples thereof may include phenyl, naphthyl, anthracenyl, pyridyl, dimethylanilinyl, anisolyl, etc.

The alkylaryl group means an aryl group in which at least one C1-20 linear or branched alkyl group is introduced. The arylalkyl group means an alkyl group in which at least one C6-20 aryl group is introduced.

The halogen means fluorine (F), chlorine (Cl), bromine (Br), or iodine (I).

According to one embodiment of the invention, it may be advantageous in terms of easiness of the synthesis of the transition metal complex for $R^1$ to $R^7$ to each independently be hydrogen or a C1-10 alkyl group. Further, it may be advantageous for $X^1$ to $X^3$ to each independently be a halogen, a C1-10 alkyl group, or a C3-20 cycloalkyl group.

Meanwhile, as non-limiting examples, the transition metal complex of Chemical Formula 1 may be represented by the following Chemical Formula 1-1, Chemical Formula 1-2, Chemical Formula 1-3, Chemical Formula 1-4, or Chemical Formula 1-5:

[Chemical Formula 1-1]

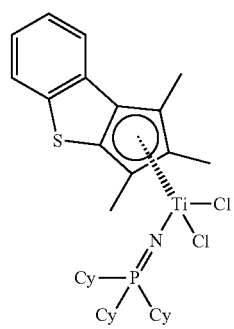

[Chemical Formula 1-2]

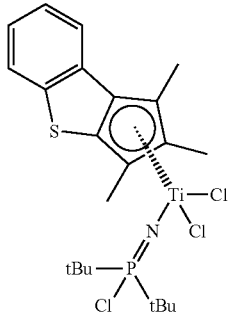

[Chemical Formula 1-3]

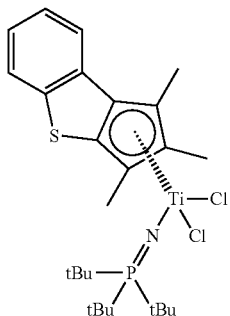

[Chemical Formula 1-4]

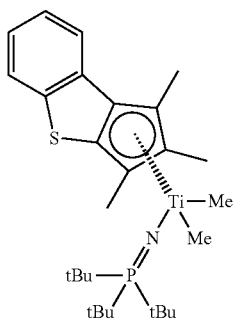

[Chemical Formula 1-5]

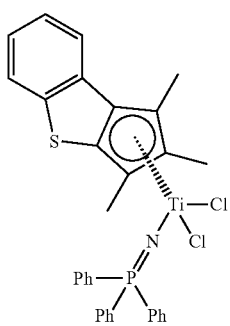

wherein, in Chemical Formulas 1-1 to 1-5, each Cy is a cyclohexyl group, each tBu is a tert-butyl group, each Me is a methyl group, and each Ph is a phenyl group.

Besides the representative examples, the transition metal complex may have various structures within the range defined in Chemical Formula 1, and these compounds may exhibit equivalent actions and effects.

The transition metal complex may be synthesized according to Scheme 1 described below.

[Scheme 1]

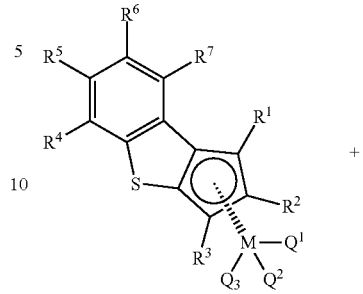

Chemical Formula 2

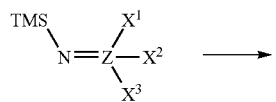

Chemical Formula 3

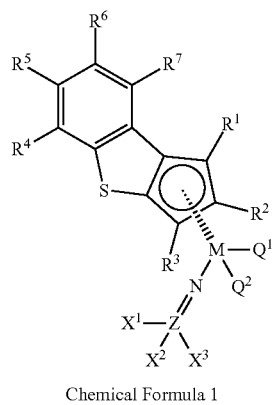

Chemical Formula 1

In Scheme 1, $R^1$ to $R^7$, M, $Q^1$, $Q^2$, Z, and $X^1$ to $X^3$ are respectively as defined in Chemical Formula 1;

$Q^3$ is hydrogen, a halogen, a C1-20 alkyl group, a C2-20 alkenyl group, a C6-20 aryl group, a C7-20 alkylaryl group, a C7-20 arylalkyl group, a C1-20 alkylamino group, a C6-20 arylamino group, or a C1-20 alkylidene group; and TMS is a tetramethylsilane group.

The synthesis method of the transition metal complex will be explained in the synthesis examples in more detail.

II. Catalyst Composition for Olefin Polymerization

According to another embodiment of the invention, a catalyst composition for olefin polymerization including the above-described transition metal complex is provided.

As explained above, the transition metal complex, if used as a catalyst for the polymerization of olefin monomers, may exhibit high activity and particularly improved copolymerization activity, thus enabling the obtainment of a low density and high molecular weight polyolefin.

The catalyst composition may include a cocatalyst. The cocatalyst is an organometal compound capable of activating the transition metal complex, and is not specifically limited as long as it may be used during olefin polymerization in the presence of a transition metal complex catalyst.

For example, the cocatalyst may be one or more compounds selected from the group consisting of the compounds represented by the following Chemical Formula 4 to 6.

$$-[Al(R^{41})-O]_c-$$ [Chemical Formula 4]

In Chemical Formula 4, $R^{41}$'s may be identical or different, and each may independently be a halogen radical, a C1-20 hydrocarbyl radical, or a C1-20 hydrocarbyl radical substituted with a halogen, and c is an integer of 2 or more.

$$D(R^{51})_3 \quad \text{[Chemical Formula 5]}$$

In Chemical Formula 5, D is aluminum or boron, and $R^{51}$ is a C1-20 hydrocarbyl or a C1-20 hydrocarbyl group substituted with a halogen.

$$[L-H]^+[Q(E)_4]^- \quad \text{[Chemical Formula 6]}$$

In Chemical Formula 6,

L is a neutral Lewis base, $[L-H]^+$ is a Bronsted acid, Q is boron or aluminum of a +3 oxidation state, and E's are each independently a C6-20 aryl group or a C1-20 alkyl group of which one or more hydrogen atoms are unsubstituted or substituted with a halogen, a C1-20 hydrocarbyl, an alkoxy functional group, or a phenoxy functional group.

According to one embodiment, the compound represented by Chemical Formula 4 may be an alkylaluminoxane such as methylaluminoxane, ethylaluminoxane, isobutylaluminoxane, butylaluminoxane, etc. Further, it may be modified alkylaluminoxane (MMAO) in which two or more kinds of alkylaluminoxane are mixed.

In addition, according to one embodiment, the compound represented by Chemical Formula 5 may be trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, triisobutylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, etc.

According to one embodiment, the compound represented by Chemical Formula 6 may be triethylammonium tetra(phenyl)boron, tributylammonium tetra(phenyl)boron, trimethylammonium tetra(phenyl)boron, tripropylammonium tetra(phenyl)boron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra(pentafluorophenyl)boron, N,N-diethylanilinium tetra(phenyl)boron, N,N-diethylanilinium tetra(phenyl)boron, N,N-diethylanilinium tetra(pentafluorophenyl)boron, diethylammonium tetra(pentafluorophenyl)boron, triphenylphosphonium tetra(phenyl)boron, trimethylphosphonium tetra(phenyl)boron, triethylammonium tetra(phenyl)aluminum, tributylammonium tetra(phenyl)aluminum, trimethylammonium tetra(phenyl)aluminum, tripropylammonium tetra(phenyl)aluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetra(pentafluorophenyl)aluminum, N,N-diethylanilinium tetra(phenyl)aluminum, N,N-diethylanilinium tetra(phenyl)aluminum, N,N-diethylanilinium tetra(pentafluorophenyl)aluminum, diethylammonium tetra(pentafluorophenyl)aluminum, triphenylphosphonium tetra(phenyl)aluminum, trimethylphosphonium tetra(phenyl)aluminum, triphenylcarbonium tetra(phenyl)boron, triphenylcarbonium tetra(phenyl)aluminum, triphenylcarbonium tetra(p-trifluoromethylphenyl)boron, triphenylcarbonium tetra(pentafluorophenylboron), etc.

Further, the cocatalyst may be an organoaluminum compound, an organoboron compound, an organomagnesium compound, an organozinc compound, an organolithium compound, or a mixture thereof.

For example, the cocatalyst is preferably an organoaluminum compound, and more preferably, it may be one or more compounds selected form the group consisting of trimethyl aluminum, triethyl aluminum, triisopropyl aluminum, triisobutyl aluminum, ethylaluminum sesquichloride, diethylaluminum chloride, ethyl aluminum dichloride, methylaluminoxane, and modified methylaluminoxane.

The content ratio of the components making up the catalyst composition may be determined considering the catalytic activity. For example, in the catalyst composition, it may be advantageous in terms of securing of catalytic activity for the mole ratio of the transition metal complex to the cocatalyst to be controlled to 1:1 to 1:10,000, 1:1 to 1:5,000, or 1:1 to 1:3000.

Further, the catalyst composition may be used while being supported on a carrier. The carrier may be a metal, a metal salt, or a metal oxide, etc. that is commonly applied in supported catalysts. As non-limiting examples, the carrier may be silica, silica-alumina, silica-magnesia, etc., and it may include an oxide, a carbonate, a sulfate, or a nitrate of a metal such as $Na_2O$, $K_2CO_3$, $BaSO_4$, $Mg(NO_3)_2$, etc.

The components making up the catalyst composition may be added simultaneously or in any sequence, in the presence of absence of appropriate solvents and olefin monomers, and act as an active catalyst system. Here, the appropriate solvent may include hexane, heptane, toluene, diethylether, tetrahydrofuran, acetonitrile, dichloromethane, chloroform, chlorobenzene, methanol, acetone, etc.

III. Preparation Method of Polyolefin

According to another embodiment of the invention, a method for preparing a polyolefin including the step of polymerizing olefin monomers in the presence of the above-described catalyst composition for olefin polymerization, is provided.

The polymerization reaction may be conducted by any possible common processes applied for the polymerization of olefin monomers, such as continuous solution polymerization, bulk polymerization, suspension polymerization, slurry polymerization, emulsion polymerization, etc.

The polymerization reaction of olefin monomers may be conducted in the presence of an inert solvent. As non-limiting examples, the inert solvent may be benzene, toluene, xylene, cumene, heptane, cyclohexane, methylcyclohexane, methylcyclopentane, n-hexane, 1-hexene, 1-octene, etc.

As the olefin monomers, ethylene, alpha-olefin, cyclic olefin, etc. may be used, and diene or triene monomers having two or more double bonds may be used.

Specifically, the olefin monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosens, norbornene, norbornadiene, ethylidene norbornene, phenylnorbornene, vinylnorbornene, dicyclopentadiene, 1,4-butadiene, 1,5-pentadiene, 1,5-hexadiene, styrene, alpha-methylstyrene, divinylbenzene, 3-chloromethylstyrene, etc. The olefin monomers may be used alone or in combinations or two or more kinds. If the polyolefin is a copolymer of ethylene and other comonomers, as the comonomers, propylene, 1-butene, 1-hexene, 4-methyl-1-pentene, 1-octene, etc. may be used.

The polymerization reaction of olefin monomers may be conducted at a temperature of 25 to 500° C. and a pressure of 1 to 100 bar for 5 minutes to 24 hours. Here, considering the yield of the polymerization reaction, the temperature of the polymerization reaction may preferably be 25 to 200° C., and more preferably 120 to 160° C. Further, the polymerization pressure may preferably be 1 to 70 bar, and more preferably, 5 to 40 bar. The polymerization reaction time may preferably be 5 minutes to 5 hours, 5 minutes to 1 hour, or 5 minutes to 10 minutes.

Advantageous Effects

The transition metal complex according to the present invention exhibits high activity and improved copolymerization activity in the polymerization of olefin monomers, thus enabling the preparation of a polyolefin having a high molecular weight but low density.

DETAILED DESCRIPTION OF THE EMBODIMENTS

Hereinafter, preferable examples will be presented for better understanding of the present invention. However, these examples are presented only as the illustrations of the present invention, and the present invention is not limited thereby.

Synthesis Example 1

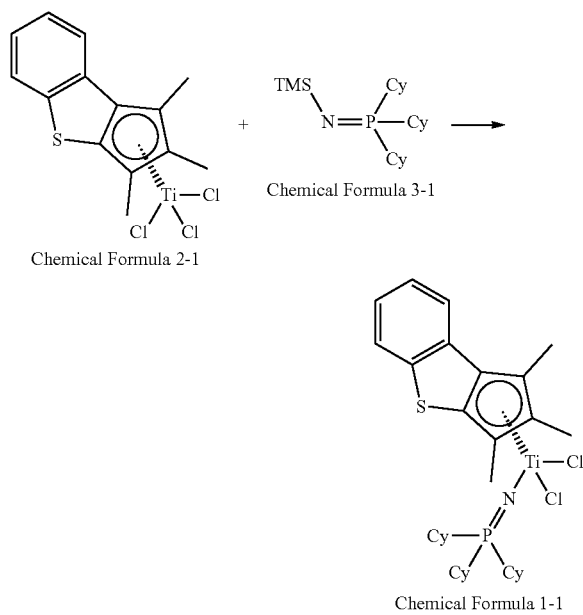

(i) 1,2-dimethyl-1H-benzo[b]cyclopenta[d]thiophen-3(2H)-one (15.854 g, 73.3 mmol) was dissolved in THF (180 mL), and then MeMgBr (50 mL, 146.6 mmol, 2 eq.) was slowly added dropwise at 0° C. Thereafter, the temperature was slowly raised and the solution was stirred at room temperature for 12 hours. After confirming by TLC that the starting material disappeared, distilled water (10 mL) was slowly added dropwise and the solution was stirred for 10 minutes. Thereafter, 6N HCl (180 mL) was added, and the solution was stirred for 12 hours. As a result of TLC confirmation, it was confirmed that the starting material in the form of an alcohol disappeared, and hexane (50 mL) was added, followed by the removal of an aqueous layer through extraction and the removal of extra moisture through $MgSO_4$ and vacuum filtration of the solvents, thus obtaining 1,2,3-trimethyl-3H-benzo[b]cyclopenta[d]thiophene (15.4 g, 98%).

$^1$H NMR (500 MHz, in Benzene): 7.83 (d, 1H), 7.71 (d, 1H), 7.35 (t, 1H), 7.20 (t, 1H), 3.33 (m, 1H), 2.09 (s, 3H), 2.04 (s, 3H), 1.40 (d, 3H).

(ii) The 1,2,3-trimethyl-3H-benzo[b]cyclopenta[d]thiophene (14.57 g, 67.98 mmol) was dissolved in THF (230 mL), and then n-BuLi (28.6 mL, 71.38 mmol, 1.05 eq.) was slowly added dropwise at 0° C. Thereafter, the temperature was slowly raised and the solution was stirred at room temperature for 12 hours. After confirming by NMR that the starting material disappeared, TMSCl (12.9 mL, 101.97 mmol, 1.5 eq.) was slowly added dropwise at room temperature and the solution was stirred at room temperature for 12 hours. It was confirmed by NMR that the starting material disappeared, and the THF solvent was vacuum filtered, and then the reaction mixture was dissolved in hexane (150 mL). Thereafter, LiCl was removed through filtration, and the solvent was vacuum filtered to obtain a mixture of trimethyl (1,2,3-trimethyl-1H-benzo[b]cyclopenta[d]thiophen-1-yl) silane and trimethyl(1,2,3-trimethyl-3H-benzo[b]cyclopenta[d]thiophen-3-yl)silane (18.5 g, 95%).

$^1$H NMR (500 MHz, in Benzene): 8.00 (d, 1H), 7.87-7.84 (m, 2H), 7.73 (d, 1H), 7.37 (t, 1H), 7.32 (t, 1H), 7.25 (t, 1H), 7.18 (t, 1H), 2.38 (s, 3H), 2.14 (s, 3H), 2.05 (s, 3H), 2.02 (s, 3H), 1.66 (s, 3H), 1.49 (s, 3H), −0.04 (s, 9H), −0.08 (s, 9H).

(iii) The mixture of trimethyl(1,2,3-trimethyl-1H-benzo[b]cyclopenta[d]thiophen-1-yl)silane and trimethyl(1,2,3-trimethyl-3H-benzo[b]cyclopenta[d]thiophen-3-yl)silane (19.65 g, 68.58 mmol) was dissolved in $CH_2Cl_2$ (175 mL), and then $TiCl_4$ (68.60 g, 68.58 mmol, 1.0 eq.) was slowly added dropwise at room temperature, and the solution was stirred at room temperature for 12 hours. Thereafter, $CH_2Cl_2$ was completely removed through vacuum filtration, and a compound represented by Chemical Formula 2-1 (23.0 g, 91%), which is a black solid, was obtained.

$^1$H NMR (500 MHz, in Benzene): 7.64 (d, 1H), 7.19 (d, 1H), 7.06 (t, 1H), 6.96 It, 1H), 2.24 (s, 3H), 2.10 (s, 3H), 1.90 (s, 3H).

(iv) The compound represented by Chemical Formula 2-1 (1.00 g, 2.72 mmol) and a phosphinimide ligand represented by Chemical Formula 3-1 (1,1,1-trimethyl-N-(tricyclohexylphosphoranylidene)silanamine, 1.00 g, 2.72 mmol) were dissolved in toluene (20 mL), and then the solution was stirred at 80° C. for 12 hours. After confirming by NMR that the starting material disappeared, the toluene solvent was removed through vacuum filtration. Thereafter, the solid obtained in a glovebox was washed with hexane to obtain a transition metal complex represented by Chemical Formula 1-1 of a dark orange color (1.4 g, 86%).

$^1$H NMR (500 MHz, in $C_6D_6$): 7.86 (d, 1H), 7.38 (d, 1H), 7.10 (t, 1H), 6.97 (t, 1H), 2.50 (s, 3H), 2.33 (s, 3H), 2.16 (s, 3H), 2.07-0.94 (m, 33H).

Synthesis Example 2

[Scheme 1-2]

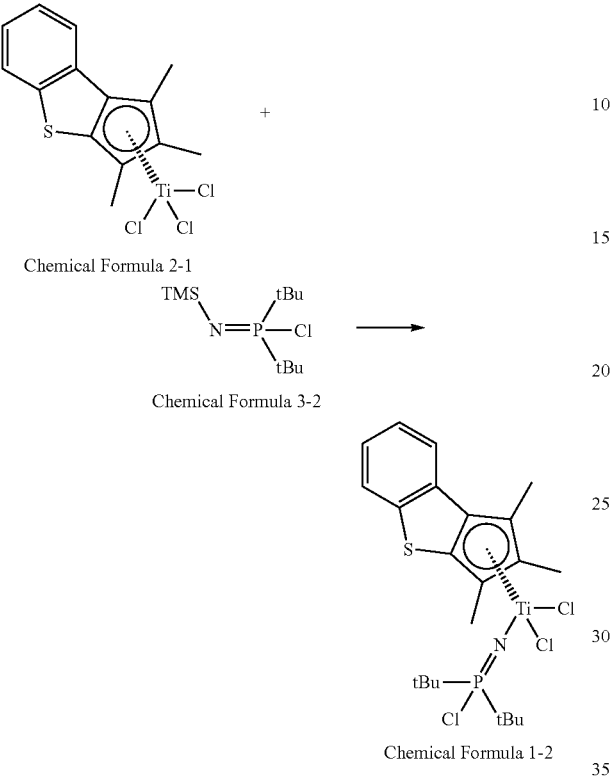

Chemical Formula 1-2

A transition metal complex represented by Chemical Formula 1-2 was obtained by the method of Synthesis Example 1, except that a compound represented by Chemical Formula 3-2 in the Scheme 1-2 (P,P-di-tert-butyl-N-(trimethylsilyl)phosphinimidic chloride) was added instead of the compound represented by Chemical Formula 3-1.

$^1$H NMR (500 MHz, in C$_6$D$_6$): 7.90 (d, 1H), 7.40 (d, 1H), 7.03 (t, 1H), 6.96 (t, 1H), 2.50 (s, 3H), 2.33 (s, 3H), 2.17 (s, 3H), 1.07 (d, 9H), 1.03 (d, 9H).

Synthesis Example 3

[Scheme 1-3]

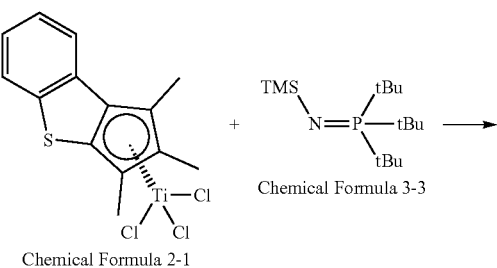

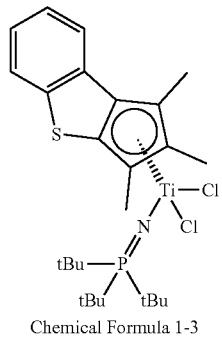

Chemical Formula 1-3

A transition metal complex represented by Chemical Formula 1-3 was obtained by the method of Synthesis Example 1, except that a compound represented by Chemical Formula 3-3 in the Scheme 1-3 ((1,1,1-trimethyl-N-(tri-tert-butylphosphoranylidene)silanamine) was added instead of the compound represented by Chemical Formula 3-1.

$^1$H NMR (500 MHz, in C$_6$D$_6$): 7.78 (d, 1H), 7.31 (d, 1H), 7.06 (t, 1H), 6.96 (t, 1H), 2.48 (s, 3H), 2.31 (s, 3H), 2.13 (s, 3H), 1.01 (d, 27H).

Synthesis Example 4

[Scheme 1-4]

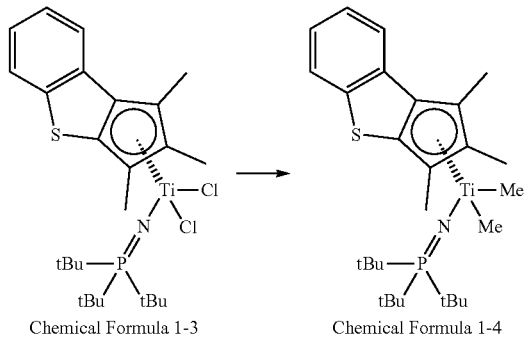

Chemical Formula 1-3　　　　　Chemical Formula 1-4

The compound represented by Chemical Formula 1-3 (1.30 g, 2.37 mmol) obtained in Synthesis Example 3 was dissolved in toluene (20 mL), and then MeMgBr (1.62 mL, 4.86 mmol, 2.05 eq.) was slowly added dropwise at room temperature. Thereafter, the solution was stirred at room temperature for 12 hours. After confirming by NMR that the starting material disappeared, the toluene solvent was vacuum filtered, and the reaction mixture was dissolved in hexane (30 mL). Thereafter, a solid was removed through filtration, and the hexane solvent in the obtained solution was vacuum filtered, thus obtaining a transition metal complex represented by Chemical Formula 1-4.

$^1$H NMR (500 MHz, in C$_6$D$_6$): 7.62 (d, 1H), 7.48 (d, 1H), 7.13 (t, 1H), 7.03 (t, 1H), 2.30 (s, 3H), 2.09 (s, 3H), 2.02 (s, 3H), 1.28 (d, 27H), −0.24 (s, 3H), −0.27 (s, 3H).

Synthesis Example 5

[Scheme 1-5]

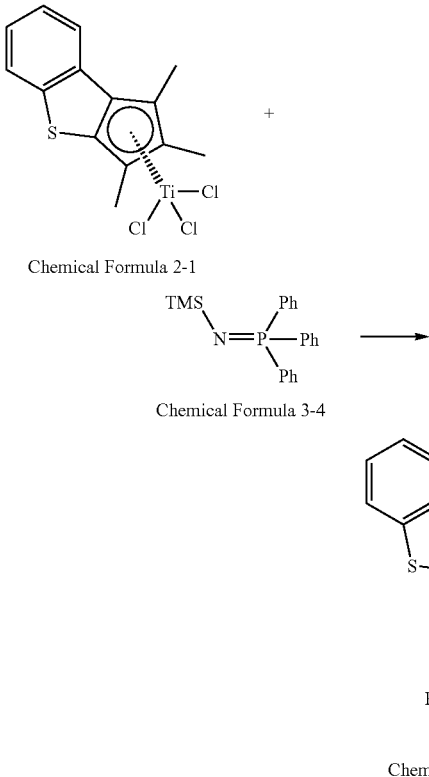

Chemical Formula 2-1

Chemical Formula 3-4

Chemical Formula 1-5

A transition metal complex represented by Chemical Formula 1-5 was obtained by the method of Synthesis Example 1, except that a compound represented by Chemical Formula 3-4 in the Scheme 1-5 (1,1,1-trimethyl-N-(triphenylphosphoranylidene)silanamine) was added instead of the compound represented by Chemical Formula 3-1.

$^1$H NMR (500 MHz, in $C_6D_6$): 7.73 (d, 1H), 7.50-7.46 (m, 5H), 7.22 (d, 1H), 7.03-7.00 (m, 2H), 6.98-6.89 (m, 10H), 2.45 (s, 3H), 2.20 (s, 3H), 2.13 (s, 3H).

Synthesis Example 6

[Scheme 1-6]

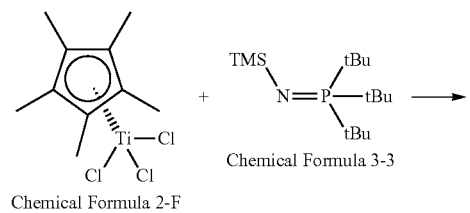

Chemical Formula 2-F

Chemical Formula 3-3

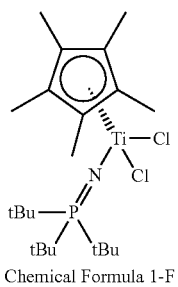

Chemical Formula 1-F

A transition metal complex represented by Chemical Formula 1-F was obtained by the method of Synthesis Example 1, except that a compound represented by Chemical Formula 2-F in Scheme 1-6 was used instead of the compound represented by Chemical Formula 2-1, and that a compound represented by Chemical Formula 3-3 was added instead of the compound represented by Chemical Formula 3-1.

$^1$H NMR (500 MHz, in $C_6D_6$): 2.15 (s, 15H), 1.53 (d, 27H).

Example 1

Into a 2 L autoclave, 1 L of hexane and 350 ml of 1-octene were added, followed by preheating of the reactor to 150° C. and ethylene saturation to 35 bar. 1 micromole (based on Ti) of the transition metal complex of Chemical Formula 1-1 according to Synthesis Example 1, 10 equivalents of N,N-dimethylanilinium tetrakis(pentafluorophenyl)borate, and triisobutyl aluminum (TIBAL, 1.0 M solution in hexane, Aldrich) as a scavenger were filled in a catalyst injection cylinder, and then introduced into the reactor. In order to maintain the pressure inside the reactor at 35 bar, a copolymerization reaction was progressed for 8 minutes while continuously introducing ethylene. The reaction heat was removed through a cooling coil inside the reactor, thus maintaining the polymerization temperature as constant as possible.

After the reaction was finished, remaining ethylene gas was exhausted, and the polymer solution was added to an excess amount of ethanol, thus inducing the precipitation of the polymer. The obtained polymer was washed with ethanol and acetone, respectively, 2 to 3 times, and then dried in a vacuum oven at 80° C. for 12 hours or more.

Example 2

A polymer was obtained by the same method as Example 1, except that the transition metal complex of Chemical Formula 1-2 according to Synthesis Example 2 was added instead of the transition metal complex of Synthesis Example 1.

Example 3

A polymer was obtained by the same method as Example 1, except that the transition metal complex of Chemical Formula 1-3 according to Synthesis Example 3 was added instead of the transition metal complex of Synthesis Example 1.

Example 4

A polymer was obtained by the same method as Example 1, except that the transition metal complex of Chemical Formula 1-4 according to Synthesis Example 4 was added instead of the transition metal complex of Synthesis Example 1.

Comparative Example 1

A polymer was obtained by the same method as Example 1, except that the transition metal complex of Chemical Formula 1-F according to Synthesis Example 6 was added instead of the transition metal complex of Synthesis Example 1.

Experimental Example

For the polymers of the examples and comparative examples, the properties were measured by the following methods, and the results are shown in Table 1.

1) The yield was measured as the ratio of the weight (g) of the produced polymer.

2) The melt index (MI) of the polymer was measured according to ASTM D-1238 (condition E, 190° C., 2.16 kg load).

3) A sample treated with an antioxidant (1000 ppm) was manufactured into a sheet with a thickness of 3 mm and a radius of 2 cm using a 180° C. press mold and cooled at 10° C./min, and the density of the polymer (g/cc) was measured in a Mettler weighing machine.

4) The glass transition temperature (Tc) and melting temperature ($T_m$) of the polymer were respectively measured using a differential scanning calorimeter (DSC 2920, TA instrument). Specifically, the polymer was heated to 220° C., the temperature was maintained for 5 minutes, it was cooled again to 20° C., and then the temperature was increased again. Here, the temperature increase speed and drop speed were respectively controlled to 10° C./min.

TABLE 1

|  | Example 1 | Example 2 | Example 3 | Example 4 | Comparative Example 1 |
|---|---|---|---|---|---|
| Yield (g) | 9.1 | 9.7 | 13.7 | 16.3 | 11.1 |
| MI (g/10 min) | 0.02 | 0.08 | 0.03 | 0.05 | 0.07 |
| Density (g/cc) | 0.908 | 0.907 | 0.918 | 0.919 | 0.924 |
| $T_c$ (° C.) | 91.2 | 89.8 | 99.9 | 102.0 | 107.8 |
| $T_m$ (° C.) | 108.1 | 106.2 | 116.1 | 116.6 | 123.4 |

Referring to Table 1, it was confirmed that the polymers of the examples were polyolefins having molecular weights equivalent to that of the polymer of Comparative Example 1 but having low density, as they were prepared using the transition metal complexes of Synthesis Examples 1 to 4.

Further, it was confirmed through Example 4 that, when $Q^1$ and $Q^2$ were substituted with alkyl groups in Chemical Formula 1, although basic properties were equivalent, the yield increased.

The invention claimed is:

1. A transition metal complex represented by the following Chemical Formula 1-1, Chemical Formula 1-2, Chemical Formula 1-3, Chemical Formula 1-4, or Chemical Formula 1-5:

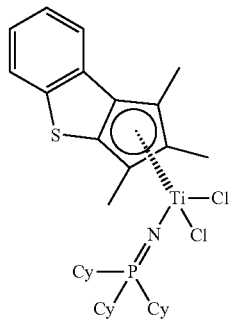

[Chemical Formula 1-1]

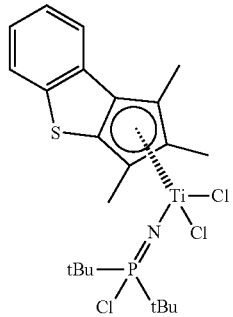

[Chemical Formula 1-2]

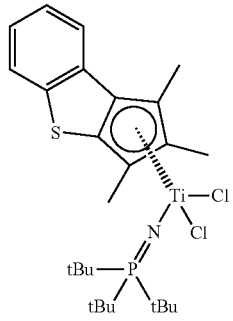

[Chemical Formula 1-3]

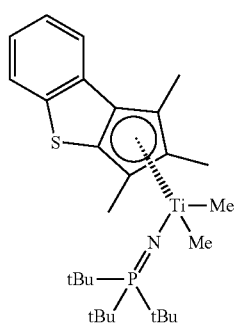

[Chemical Formula 1-4]

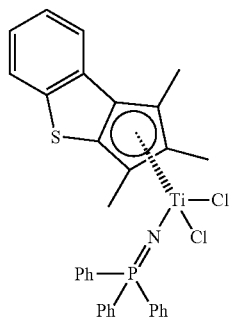

[Chemical Formula 1-5]

wherein, in Chemical Formulas 1-1 to 1-5,
each Cy is a cyclohexyl group,
each tBu is a tert-butyl group,
each Me is a methyl group, and
each Ph is a phenyl group.

2. A catalyst composition for olefin polymerization comprising the transition metal complex of claim 1 and a catalyst,
wherein the cocatalyst is one or more compounds selected from the group consisting of the compounds represented by the following Chemical Formulas 4 to 6:

      [Chemical Formula 4]

wherein, in Chemical Formula 4, $R^{41}$ is independently be a halogen radical, a C1-20 hydrocarbyl radical, or a C1-20 hydrocarbyl radical substituted with a halogen, and c is an integer of 2 or more;

$D(R^{51})_3$     [Chemical Formula 5]

wherein, in Chemical Formula 5, D is aluminum or boron, and $R^{51}$ is a C1-20 hydrocarbyl or a C1-20 hydrocarbyl group substituted with a halogen;

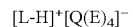      [Chemical Formula 6]

wherein, in Chemical Formula 6, L is a neutral Lewis base, $[L-H]^+$ is a Bronsted acid, Q is boron or aluminum of a +3 oxidation state, and E is independently a C6-20 aryl group or a C1-20 alkyl group of which one or more hydrogen atoms are unsubstituted or substituted with a halogen, a C1-20 hydrocarbyl, an alkoxy functional group, or a phenoxy functional group.

3. A method for preparing a polyolefin comprising:
polymerizing olefin monomers in the presence of the catalyst composition for olefin polymerization of claim 2,
wherein the polymerizing is conducted at a temperature of 25 to 500° C. and a pressure of 1 to 100 bar.

* * * * *